Sept. 27, 1932. I. SIKORSKY 1,879,715
AMPHIBIAN BOAT STRUCTURE
Filed June 5, 1929 7 Sheets-Sheet 1

Igor Sikorsky,
INVENTOR
BY
ATTORNEY

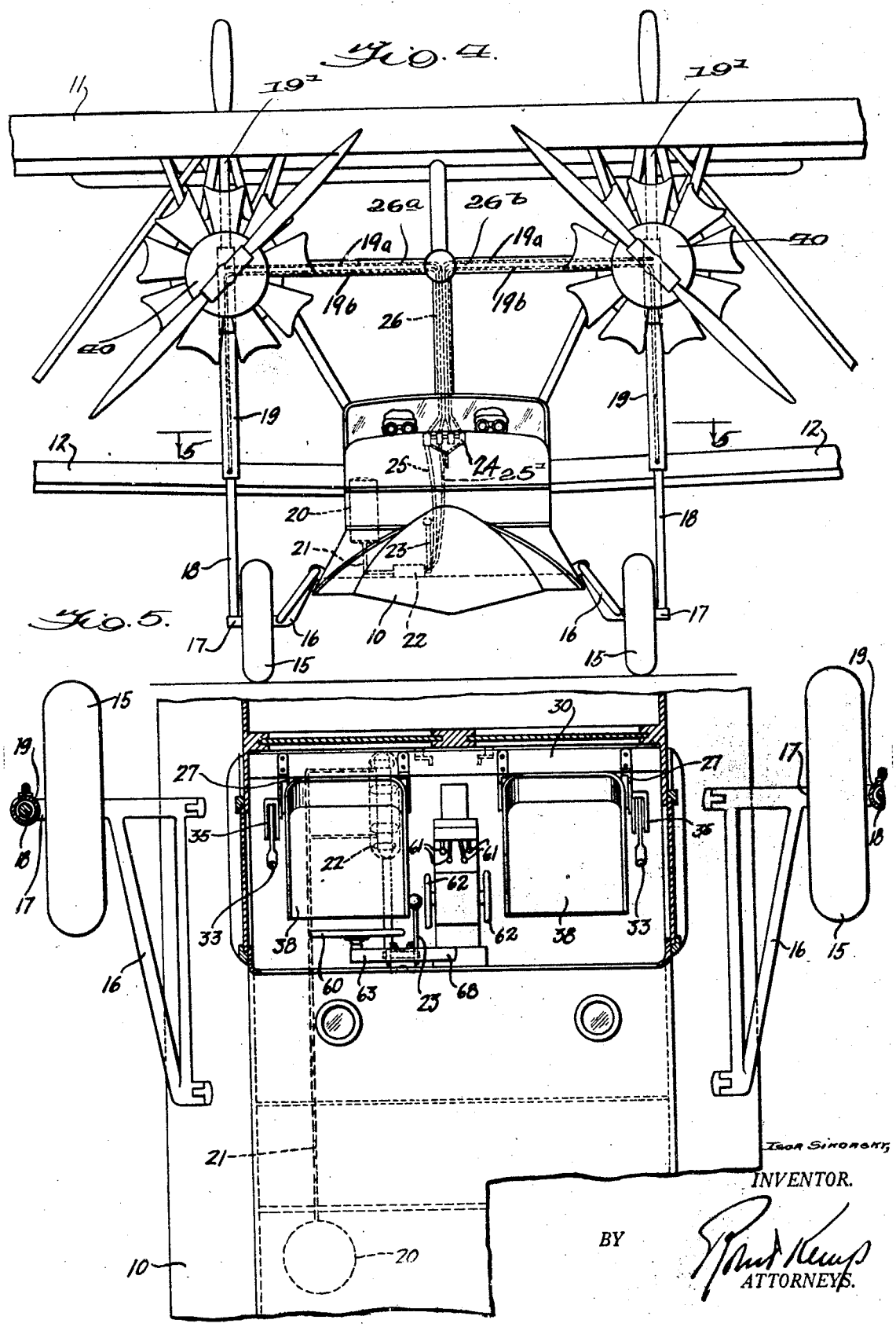

Sept. 27, 1932.　　　I. SIKORSKY　　　1,879,715
AMPHIBIAN BOAT STRUCTURE
Filed June 5, 1929　　7 Sheets-Sheet 3
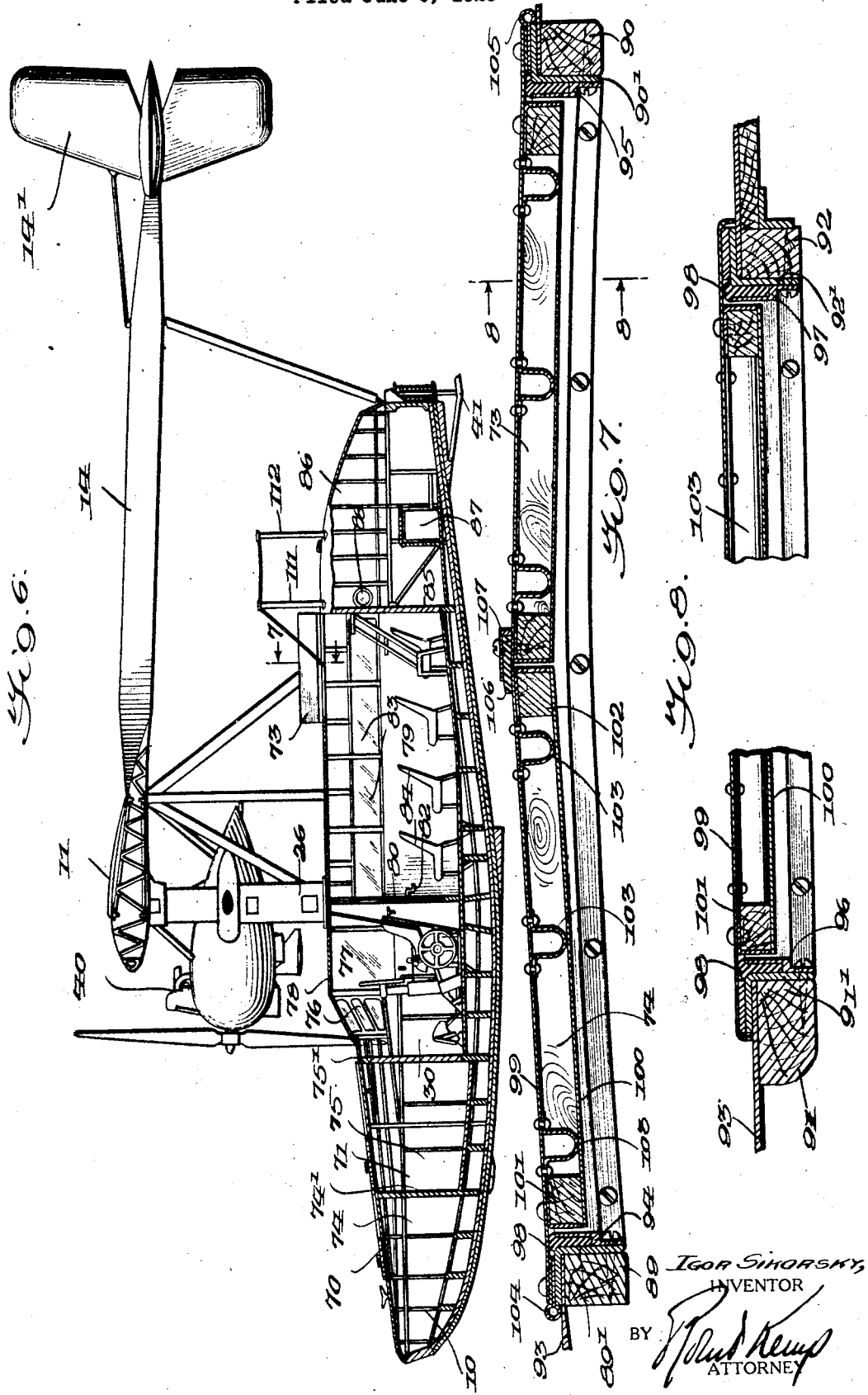

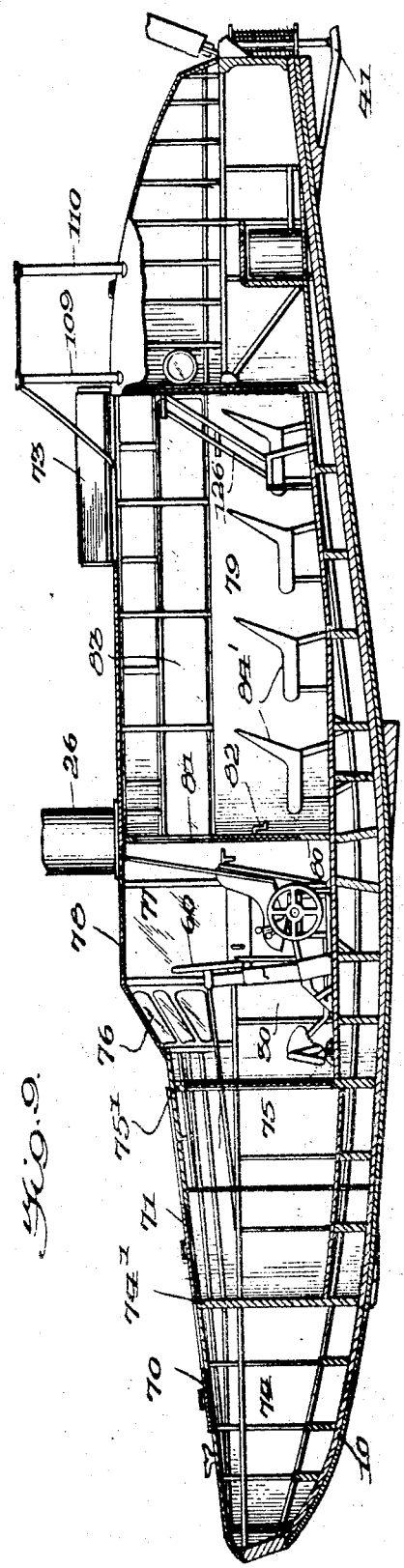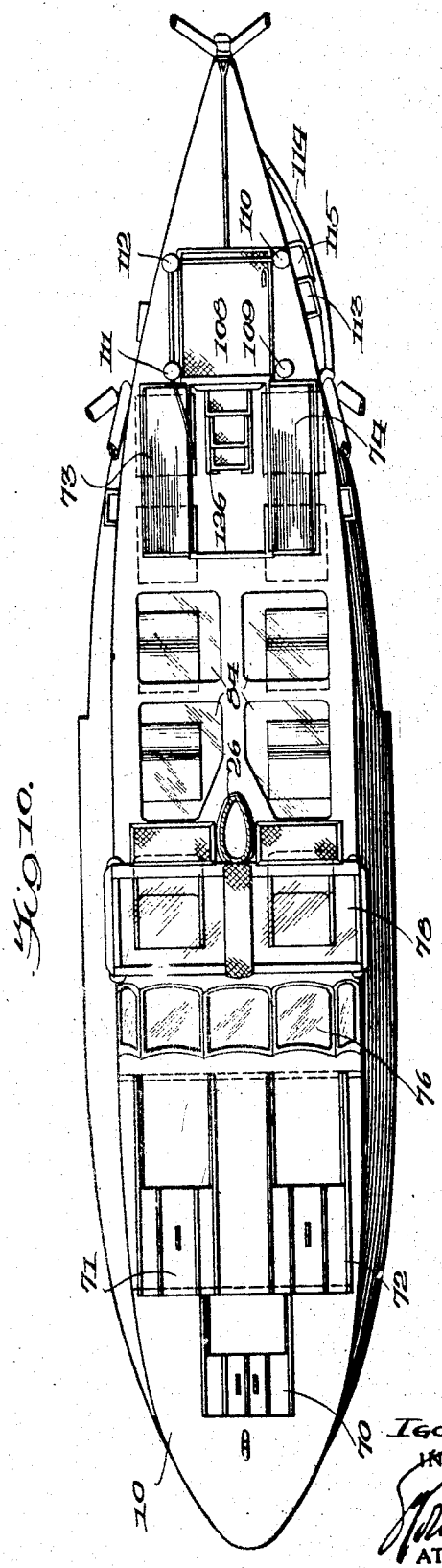

Sept. 27, 1932.  I. SIKORSKY  1,879,715
AMPHIBIAN BOAT STRUCTURE
Filed June 5, 1929   7 Sheets-Sheet 5
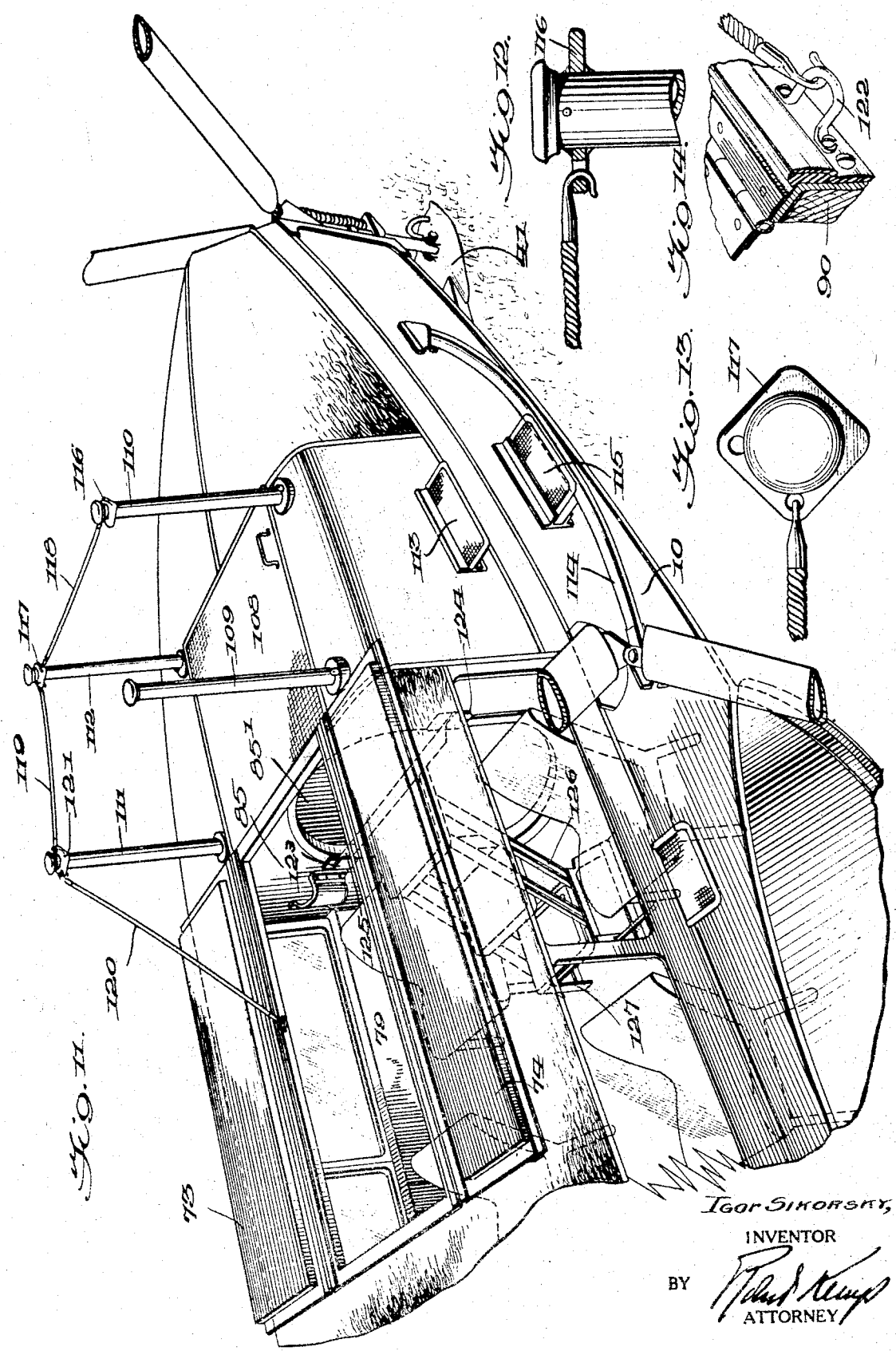
Igor Sikorsky,
INVENTOR
BY
ATTORNEY

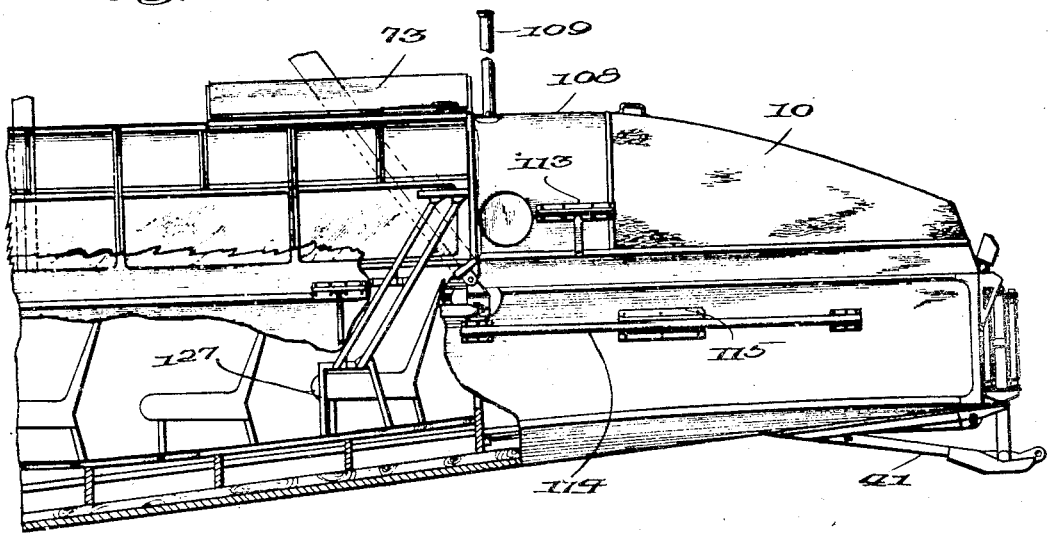
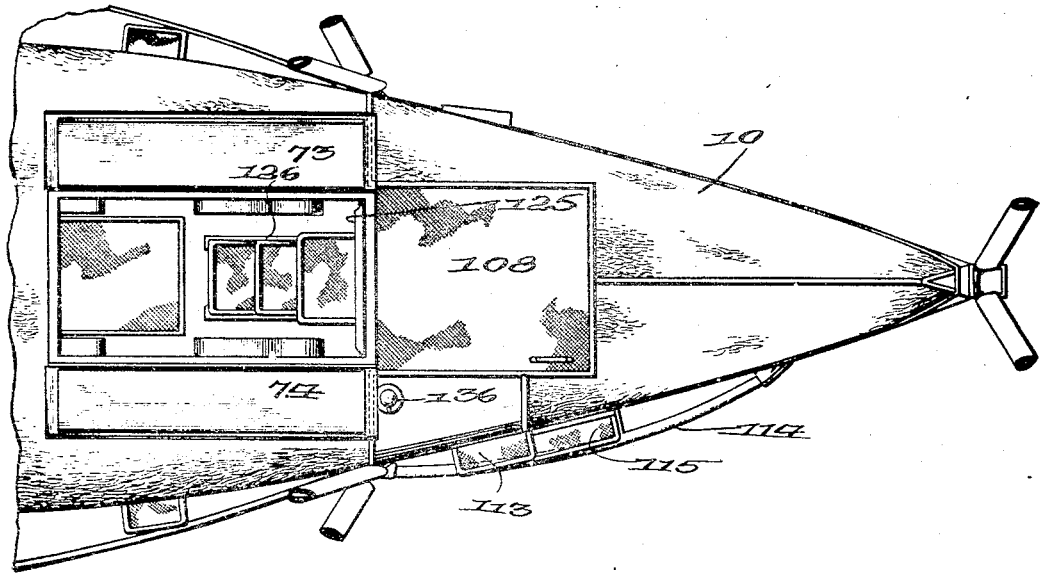

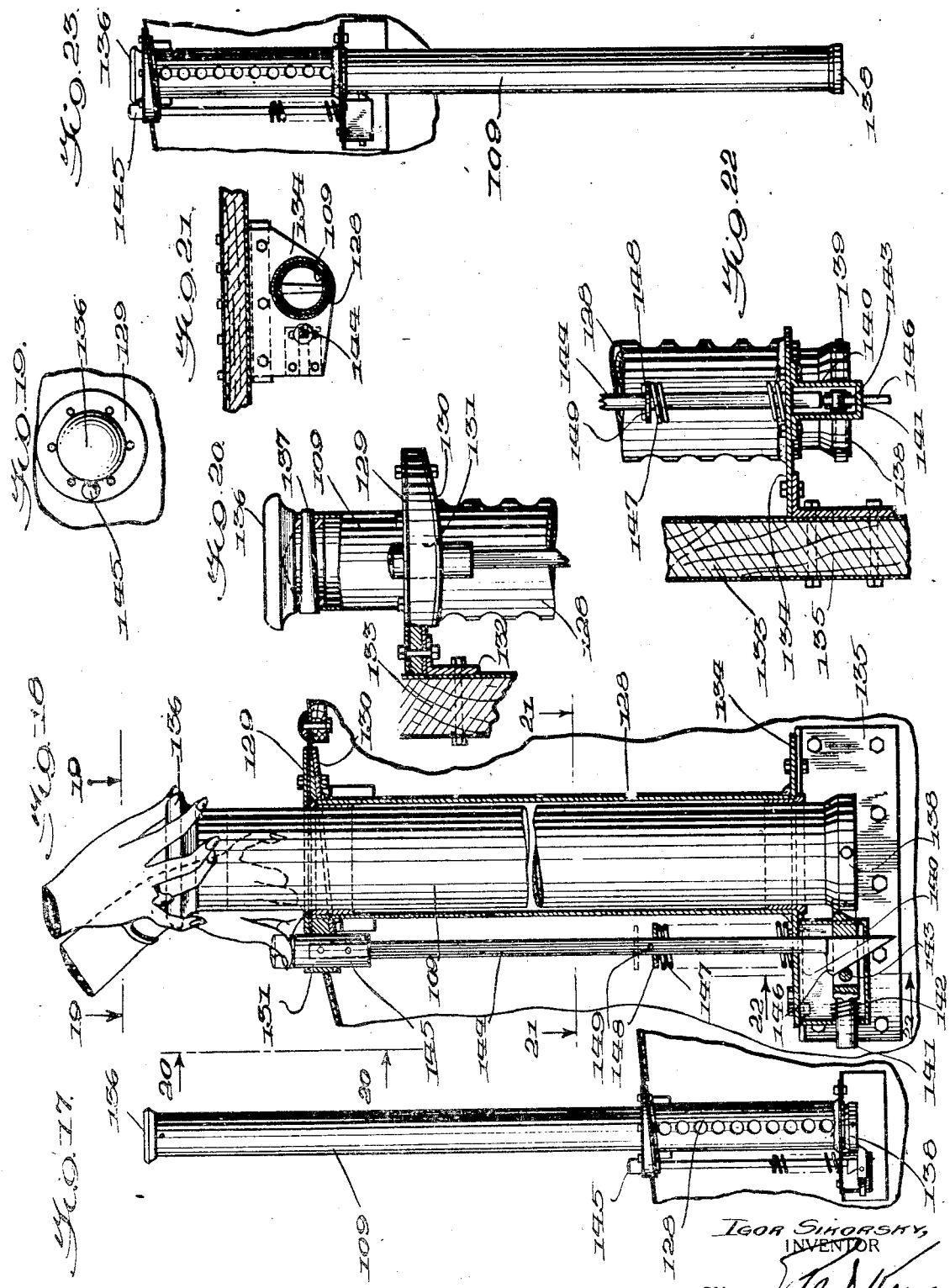

Patented Sept. 27, 1932

1,879,715

UNITED STATES PATENT OFFICE

IGOR SIKORSKY, OF COLLEGE POINT, LONG ISLAND, NEW YORK, ASSIGNOR TO SIKORSKY AVIATION CORPORATION, OF WILMINGTON, DELAWARE, A CORPORATION OF DELAWARE

AMPHIBIAN BOAT STRUCTURE

Application filed June 5, 1929. Serial No. 368,552.

The present invention relates to aircraft and has particular reference to the arrangement of the space within an aircraft body. The invention also has reference to means for facilitating the entering and leaving of an aircraft body.

In the accompanying drawings the invention is shown as embodied in a land-water type of aircraft commonly known as an amphibian. The invention will be described with reference to the body-boat of such an amphibian and it will be noted has to do with details peculiar to this type of aircraft, although many of its features are applicable to aircraft of all types.

In the drawings:

Figure 4 is an enlarged front elevation of the central portion of the amphibian.

Figure 5 is a section on line 5—5 of Figure 4.

Figure 6 is a longitudinal vertical section of the amphibian.

Figure 7 is a section on line 7—7 of Figure 6.

Figure 8 is a section on line 8—8 of Figure 7.

Figure 9 is a vertical longitudinal section of the body-boat.

Figure 10 is a plan view of the body-boat.

Figure 11 is a perspective view of the stern of the body-boat.

Figures 12, 13 and 14 are detail views.

Figure 15 is a side elevation of the stern of the body-boat with parts broken away.

Figure 16 is a plan view of the stern of the body-boat.

Figure 17 is an elevation of a stanchion adapted to be grasped by passengers entering and leaving the body-boat.

Figure 18 is an enlarged view of the stanchion and its mounting.

Figure 19 is a view of the stanchion seen in the direction of arrows 19—19, Figure 18.

Figure 20 is an elevation of that portion of the stanchion lying between arrows 20—20, Figure 18.

Figure 21 is a section on line 21—21, Figure 18.

Figure 22 is a section on line 22—22, Figure 18 and

Figure 23 is a view similar to that of Figure 17 with the stanchion in different positions relative to its guiding means.

Figure 1:
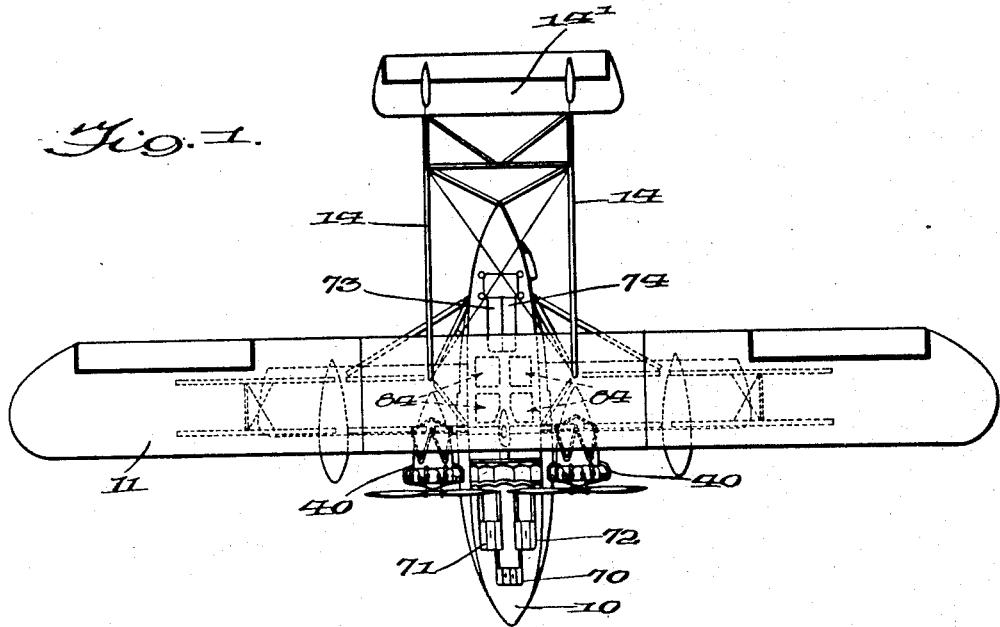
Figure 1 is a plan view of an amphibian embodying the present invention.

Referring to the drawings, 10 designates a body-boat provided in its forward deck with sliding hatches 70, 71 and 72 and in its after deck with pivoted hatches 73 and 74. Above the body-boat and in symmetrical relation to the longitudinal axis thereof is a main wing designated as a whole by the numeral 11, while projecting from each side of the body-boat are lower wings 12, the upper and lower wings being suitably connected by interplane struts.

Pontoons 13 are suspended beneath the outer ends of the lower wings, while rearwardly of the upper plane project a pair of outriggers 14 supporting at their rear ends an empennage designated as a whole by the numeral 14'.

A pair of motors 40 are suspended beneath the center section of the upper plan in symmetrical relation to the longitudinal axis of the body-boat, the motors being somewhat spaced laterally of the body and forwardly of the upper plane.

The machine may be brought to rest on the land on retractible wheels 15 and a tail skid 41. Wheels 15 are supported on axles 17 pivoted to the body-boat for oscillation in vertical planes and braced against fore and aft displacement by means of brackets 16.

To the outer ends of axles 17 are pivoted rods 18 which at their upper ends are provided with piston heads working in tubular guides or cylinders 19, the latter being in turn pivoted to the lower ends of rigidly supported members 19'.

Figure 2:
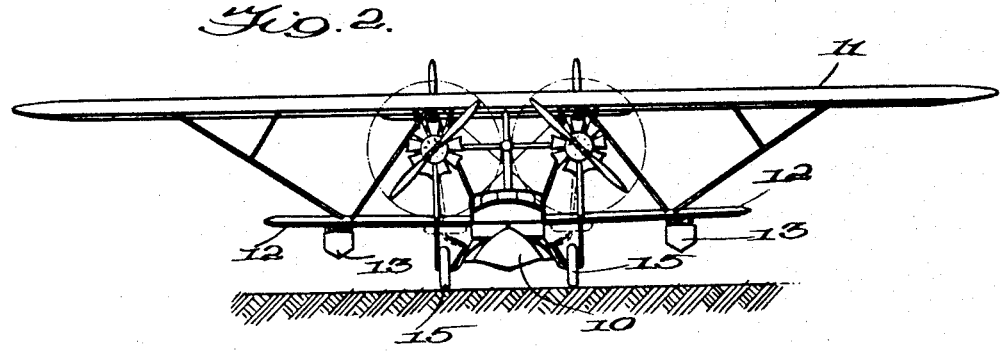
Figure 2 is a front elevation of the amphibian.
Figure 3:
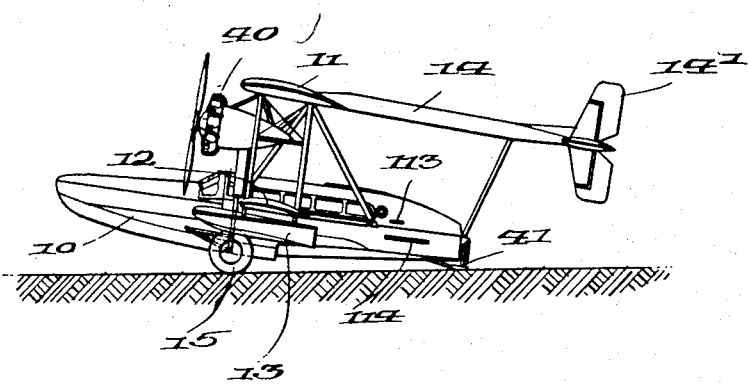
Figure 3 is a side elevation of the amphibian.

The piston heads associated with rods 18 may be reciprocated in cylinders 19 to project and hold the wheels in the operative position illustrated in Figures 2, 3 and 4, or to retract and retain them in inoperative position in horizontal planes immediately below the lower wings 12. In this connection tank 20, Figure 5, contains a supply of suitable operating fluid such as oil, glycerine or the like and is connected with a pump 22 actuated by a lever 23 through a tube 21. Feed and return pipes 25 and 25' connect the pump 22 and distributor mechanism 24 disposed on the instrument board in the pilots' compartment. By a suitable manipulation of the distributor mechanism, fluid under pressure may be supplied through pipes 19a to the upper ends of cylinders 19 to project rods 18 or to the lower ends of cylinders 19 to retract rods 18. Tubes 19a and 19b are housed in an upwardly extending streamline conduit 26 and in laterally extending branch conduits 26a and 26b.

In Figure 5 the pilots' compartment is designated as a whole by the reference numeral 30. Reference numerals 38 designate seats disposed side by side and adjustable along the vertical guide members 27 by manipulation of levers 33 which are controlled in conjunction with locking segments 35 as described in my Patent Number 1,807,939, June 2, 1931. For the rest, reference numerals 61 designate engine control levers, 62 hand wheels operable to adjust the angle of incidence of the horizontal tail surfaces, and 60 a control wheel supported on the free end of an arm 63 pivoted to an upright member 68 so that the wheel may be swung in front of either seat.

The general arrangement of the interior of the body-boat is most clearly shown in Figure 6. The nose portion of the body-boat is taken up by water-tight compartments 74 and 75, the latter being bounded fore and aft by bulkheads 74' and 75'. Access may be had to the forward compartment through hatch 70 and to compartment 75 through hatches 71 or 72. Bulkhead 75 is also provided with a door which upon occasion may be opened to give access to compartment 75 from the pilots' compartment 30 which lies directly to the rear.

Pilots' compartment 30 is provided with forward windows 76, side windows 77 and an upper window 78 so that the pilot has unobstructed vision forwardly, laterally and upwardly, this range of vision taking in the landing wheels and motors with their propellors.

A passenger compartment 79 is arranged immediately to the rear of the pilots' compartment and is separated from the latter by a partition 80 provided with windows 81 which may be raised and lowered by means of a crank 82. Compartment 79 is provided with lateral windows 83 and top windows 84. Rows of chairs 84' are disposed along the side walls of compartment 79.

A partition 85 separates the passenger compartment 79 from a stern compartment 86 which is utilized as a toilet and has a dry closet 87 disposed therein. Reference numeral 88 denotes a ventilator in this after compartment.

Immediately in front of partition 85 the roof of compartment 79 is provided with a hatchway adapted to be closed by hatches 73 and 74. The hatchway is bounded by frame members 89, 90, 91 and 92, Figures 7 and 8, secured to the room sheathing 93 through angle strips 89', 90', 91' and 92'. Z-bars 94, 95, 96 and 97 are secured by means of screws to the horizontal faces of the angle strips to form pockets adapted to receive packing means 98 of rubber or the like.

Each hatch comprises an outer plate 99 and an inner plate 100 connected together through marginal blocks as at 101 and 102 and spaced at intermediate points by means of hollow ribs as at 103. The outer lateral margins of the hatches have respectively a leaf of hinges 104 and 105 secured thereto, the other leaf of the hinges being secured to the upper faces of angle strips 89' and 90'.

When the hatches are closed their lower margins contact with the upper edges of packing strips 98, while hatch 73 has a packing strip 106 retained in position by means of an angle strip 107 so as to overlap the adjacent margin of hatch 74. These packing provisions render the hatchways absolutely water-tight.

Immediately to the rear of the passenger compartment hatchway is a deck or platform 108 at the four corners of which, Figures 9, 10, and 11, are disposed stanchions 109, 110, 111 and 112 which, as will be hereinafter described, may assume the upwardly extending position illustrated, or may be moved downwardly substantially out of sight so as to present no air resistance. A step 113 is secured to the port side of the body-boat below and between stanchions 109 and 110 and below step 113 is disposed a bowed rail 114 which serves as a hand rail and bumper or fender. A foot board 115 is secured between rail 114 and the body-boat.

Steps 115 and 113 are utilized in entering or leaving the boat via deck 108, the stanchions at such times being in the upwardly extended position illustrated so as to be readily grasped. Stanchions 110, 111 and 112 are preferably provided with a collar as at 116 and 117 in a perforation or perforations of which are adapted to be secured the hooked ends of guide ropes 118 and 119. A guide rope 120 is adapted to connect collar 121 or stanchion 111 with a staple 122 secured to the hatchway frame member 90.

Partition 85 is provided with a centrally located doorway in which is mounted a swinging door 85', the door jams have secured thereto brackets 123 and 124 in which are adapted to be engaged the ends of a cross bar 125 secured to the upper end of a ladder 126. A pedestal or frame 127 supports the lower end of the ladder 126. In the position shown, the ladder provides access to the interior passenger compartment, stanchions 109 and 111 being so disposed to be within ready reach of one ascending and descending the ladder. On the other hand the cross bar 125 may be disconnected from brackets 123 and 124 and the lower end of the ladder disengaged from pedestal 127 so that the ladder may be removed to give access to door 85'.

The stanchions are all of similar construction and will be described particularly with reference to Figures 17 to 23 in which stanchion 109 is shown. The stanchion which is preferably tubular is guided in a tubular guide member 128 which for the sake of lightness may be provided with suitable cutouts. The upper end of member 128 is welded or otherwise secured in a combined bracket and fitting member comprising upper and lower plates 129 and 130, an intermediate block 131 and an angle member 132 secured to a rib 133 of the body-boat.

The lower end of member 128 is welded in an aperture for a bracket comprising a plate 134 and an angle member 135 secured to rib 133 below the first described bracket so that member 128 is rigidly supported in vertical position.

The upper end of the stanchion is provided with a cap 136 retained in position by means of a pin 137, while at the lower end of the stanchion a ring 138 having an upper bevelled face is secured in position by means of a pin 139. Cap 136 is of such a shape as to be readily grasped to lift the stanchion and it also acts to limit downward movement of the stanchion through engagement with the upper end of member 128. Ring 138 serves to limit upward movement of the stanchion through abutment with the lower end of member 128.

Secured to the lower face of plate 134 adjacent the stanchion is a rectangular frame 140 in aligned horizontal apertures of which is guided a latch 141 arranged on a substantially radial line of the stanchion. The forward portion of latch 141 has a substantially rectangular section and the copending aperture of frame 140 is of similar shape so that the latch is prevented from rotating about its longitudinal axis. The nose of the latch is downwardly bevelled and is urged in the direction of the stanchion by means of a compression spring 142 interposed between the rear wall of frame 140 and the forward enlarged portion of the latch. Further, the forward portion is provided with a vertical through slot across which extends a pin 143.

Plunger 144 is guided in the brackets for longitudinal movement parallel to the stanchion. At its upper end plunger 144 is provided with a head 145, while its lower end is expanded to form a substantially triangular head 146 which projects in the slot of latch 141. Plunger 144 is normally yieldably retained in the position of Figures 17 and 23 or the dotted line position of Figure 18 by means of a spring 147 interposed between plate 134 and a washer 148 surrounding plunger 144 and held against upper displacement by means of a pin 149.

As shown in Figure 23, the nose of latch 141 is bearing against the surface of stanchion 109 due to the influence of spring 142. If the stanchion is lifted, ring 138 will eventually strike the nose of the latch and move the latch rearwardly. After the ring has passed the latch will spring under it to retain the stanchion securely in its upwardly extended position. When the stanchion has served its purpose it is merely necessary to depress plunger 144 whereupon the cam face of head 146 coacting with pin 143 causes the retraction of the latch so that the stanchion is enabled to gravitate to its lower position in which it is substantially entirely concealed within the body-boat.

While I have described an embodiment of my invention with some particularity, it will be understood that I do not intend to limit myself except as determined in the following claims.

I claim:

1. In multi-motored amphibian aircraft a body-boat structure, a wing or supporting surface connected to said body-boat structure, two engines connected to said wing, a pilot's compartment in said body-boat forward of said wing, a passenger compartment aft of said wing, a hatchway in the ceiling of said passenger compartment, retractable landing gear attached to said body-boat and means in said body-boat for retracting said landing gear, said passenger compartment extending aft of said retractable landing gear.

2. In a multi-motored amphibian aircraft a body-boat structure, a wing connected to said body-boat, a plurality of motors fastened to said wing, a water tight compartment in the forward portion of said body-boat, a pilot's compartment aft of said water-tight compartment, a passenger compartment aft of said pilots' compartment, a hatchway in the ceiling of said passenger compartment, retractable landing gear attached to said body-boat and means in said pilot's compartment for retracting said landing gear, said passenger compartment extending aft of said retractable landing gear.

3. In multi-motored amphibian aircraft a body-boat structure, a wing supporting said body-boat structure in flying, water-tight compartments separated by water-tight bulkheads located in the forward portion of said body-boat, a pilot's compartment aft of said water-tight compartment, a toilet aft of said passenger compartment, an over-head hatchway for admitting passengers to said passenger compartment, a platform on the top of said body-boat structure over said toilet and adjacent said hatchway, hydraulic retractable landing gear attached to said body-boat and means in said body-boat for hydraulically retracting said landing gear, said passenger compartment extending aft of said retractable landing gear.

4. In multi-motored amphibian aircraft a body-boat structure, a wing or supporting surface connected to and extending over said body-boat structure, a plurality of motors with tractor propellers connected to said wing, a pilot's compartment in said body-boat forward of said wing, a passenger compartment aft of said wing, a hatchway in the ceiling of said passenger compartment, retractable landing gear attached to said body-boat and means for retracting said landing gear, said passenger compartment extending aft of said retractable landing gear.

5. In water aircraft a body-boat structure, a wing connected to said body-boat structure, a plurality of motors associated with said wing, water-tight compartments separated by water-tight bulk heads in the forward portion of said body-boat, a pilot's compartment aft of said water-tight compartment, a passenger compartment aft of said pilot's compartment, a hatchway in the ceiling of said passenger compartment retractable landing gear attached to said body-boat carrying wheels, said wheels position forward of the center of gravity of said body-boat, said passenger compartment extending aft of said retractable landing gear.

6. In multi-motored amphibian aircraft a body-boat structure, water-tight compartments separated by water-tight bulk heads in the forward portion of said body-boat, a pilot's compartment aft of said water-tight compartment, a passenger compartment aft of said pilots' compartment, a toilet aft of said passenger compartment, a hatchway in the roof of said body-boat for admitting passengers to said passenger compartment, a platform on the top of said body-boat structure over said toilet and adjacent said hatchway retractable landing gear attached to said body-boat carrying wheels, said wheels position forward of the center of gravity of said body-boat and a step on the outside of the body boat structure adjacent said hatchway for enabling passengers to enter and leave the body boat when it is resting either on land or in the water.

7. In a body-boat structure for water aircraft, a plurality of water-tight compartments separated by water-tight bulk heads in the forward portion of said body-boat, a pilot's compartment aft of said water-tight compartment, said pilots' compartment having windows, a passenger compartment aft of said pilots' compartment, said passenger compartment having top and side windows and positioned aft of said pilots' compartment, a toilet aft of said passenger compartment, retractable wheels fastened to said body-boat and capable of resting on the ground forward of the center of gravity of said body-boat, means of said body boat for controlling said wheels, a hatchway in the roof of said passenger compartment, a platform on the roof of said body-boat adjacent said hatchway, stairs leading from the interior of said passenger compartment up to said platform adjacent said hatchway and a step on the outside of the body boat structure adjacent said hatchway for enabling passengers to enter and leave the body boat when it is resting either on land or in the water.

8. In amphibian aircraft a wing or supporting surface, a body-boat structure, retractible landing gear mounted on said body-boat, a pilot's compartment in said body-boat forward of said wing, a passenger compartment aft of said wing and a hatchway in the ceiling of said passenger compartment and step means on the outside of said body boat structure adjacent to said hatchway for enabling passengers to more readily and safely enter and leave the body boat structure when it is either on land or in the water, said step means being positioned aft of said retractable landing gear mounted on said body boat.

9. In amphibian aircraft a wing or supporting surface, a body boat structure, retractible landing gear mounted on said body-boat, a water tight compartment in the forward portion of said body-boat, a pilot's compartment aft of said water-tight compartment, a passenger compartment aft of said pilots' compartment, and a hatchway in the ceiling of said passenger compartment and step means on the outside of said body boat structure adjacent to said hatchway for enabling passengers to more readily and safely enter and leave the body boat structure when it is either on land or in the water, said step means being positioned aft of said retractable landing gear mounted on said body boat.

10. In amphibian aircraft a wing or supporting surface, a body-boat structure, retractable landing gear mounted on said body boat, water-tight compartments separated by water-tight bulk heads located in the forward portion of said body-boat, a pilot's compartment aft of said water-tight compartments, a passenger compartment aft of said pilots' compartment, a toilet aft of said passenger compartment, an over-head hatchway for admitting passengers to said passenger compartment and a platform on the top of said body-boat structure over said toilet and adjacent said hatchway and step means on the outside of said body boat structure adjacent to said hatchway for enabling passengers to more readily and safely enter and leave the body boat structure when it is either on land or in the water, said step means being positioned aft of said retractable landing gear mounted on said body boat.

11. An amphibian aircraft a wing or supporting surface, a body-boat structure, retractible landing gear mounted on said bodyboat, water-tight compartments separated by water-tight bulk heads in the forward portion of said body-boat, a pilot's compartment aft of said water-tight compartment, a passenger compartment aft of said pilots' compartment, a hatchway in the ceiling of said passenger compartment, and step means on the outside of said body boat structure adjacent to said hatchway for enabling passengers to more readily and safely enter and leave the body boat structure when it is either on land or in the water, said step means being positioned aft of said retractable landing gear mounted on said body boat.

12. In amphibian aircraft a wing or supporting surface, a body-boat structure, a retractible landing gear mounted on said bodyboat, water-tight compartments separated by water-tight bulk heads in the forward portion of said body-boat, a pilot's compartment aft of said water-tight compartment, a passenger compartment aft of said pilots' compartment, and extending rearwardly from said retractable landing gear, a toilet aft of said passenger compartment, a hatchway in the roof of said body-boat for admitting passengers to said passenger compartment, a platform on the top of said body boat structure over said toilet and adjacent said hatchway.

13. In amphibian aircraft a wing or supporting surface, a body-boat structure, retractible landing gear mounted on said bodyboat, a plurality of water-tight compartments separated by water-tight bulk heads in the forward portion of said body-boat, a pilot's compartment aft of said water-tight compartment, said pilots' compartment having side, front, rear and top windows, a passenger compartment aft of said pilots' compartment, and extending rearwardly from said retractable landing gear, said passenger compartment having top and side windows, a toilet aft of said passenger compartment, a ventilator in the wall of said toilet, a hatchway in the roof of said passenger compartment, a platform on the roof of said body-boat adjacent said hatchway, stairs leading from the interior of said passenger compartment up to said platform adjacent said hatchway.

14. In water aircraft a body-boat structure, a wing or supporting surface connected to said body-boat structure, wheels attached to said body-boat structure forward of the center of gravity of said body-boat, means for controlling said wheels, a pilot's compartment in said body-boat forward of said wing, a passenger compartment aft of said wing and a hatchway in the ceiling of said passenger compartment, and steps on the outside of the body boat structure adjacent to said hatchway for enabling pasesngers to more readily and safely enter and leave the body boat structure when it is either on land or in the water, said step means being positioned aft of said retractable landing gear mounted on said body boat.

15. In a water aircraft a body-boat structure, hydraulic retracting controls for retracting said wheels, said controls located in said body-boat structure, retractable wheels attached to said body-boat structure, a water tight compartment in the forward portion of said body-boat, a pilot's compartment aft of said water-tight compartment, a passenger compartment aft of said pilots' compartment and a hatchway in the ceiling of said passenger compartment, and steps on the outside of the body boat structure adjacent to said hatchway for enabling passengers to more readily and safely enter and leave the body boat structure when it is either on land or in the water, said step means being positioned aft of said retractable landing gear mounted on said body boat.

16. In water aircraft a body-boat structure, hydraulic retracting controls for retracting said wheels, said controls located in said body-boat structure, retractable wheels attached to said body-boat structure, watertight compartments separated by water-tight bulk heads located in the forward portion of said body-boat, a pilot's compartment aft of said water-tight compartments, a passenger compartment aft of said pilots' compartment, a toilet aft of said passenger compartment, an over-head hatchway for admitting passengers to said passenger compartment and a platform on the top of said body-boat structure over said toilet and adjacent said hatchway, and steps on the outside of the body boat structure adjacent to said hatchway for enabling passengers to more readily and safely enter and leave the body boat structure when it is either on land or in the water, said step means being positioned aft of said retractable landing gear mounted on said body boat.

17. In water aircraft a body-boat structure, retractable wheels attached to said body-boat structure forward of the center of gravity of said body-boat, a wing or supporting surface connected to and extending over said body-boat structure, an engine associated with said wing, a pilot's compartment in said body-boat forward of said wing, a passenger compartment aft of said wing, a hatchway in the ceiling of said passenger compartment and hydraulic means in said body-boat structure for controlling the lifting and lowering of said retractable wheels hydraulically and steps on the outside of the body boat structure adjacent to said hatchway for enabling passengers to more readily and safely enter and leave the body boat structure when it is either on land or in the water, said step means being positioned aft of said retractable landing gear mounted on said body boat.

18. In water aircraft a body-boat structure, wheels attached to said body-boat structure forward of the center of gravity of said body-boat, water-tight compartments separated by water-tight bulk heads in the forward portion of said body-boat, a pilot's compartment aft of said water-tight compartment, a passenger compartment aft of said pilots' compartment, a hatchway in the ceiling of said passenger compartment, said passenger compartment and said hatchway in the ceiling of said passenger compartment being positioned aft of the center of gravity of the body-boat and aft of the retractable landing gear to enable passengers to enter and leave the body-boat structure more readily and safely when it is positioned either on the land or in the water.

19. In water aircraft a body-boat structure, wheels attached to said body-boat structure, adjacent said pilots' compartment, a passenger compartment aft of said pilots' compartment, a toilet aft of said passenger compartment, and hatchway in the roof of said body-boat for admitting passengers to said passenger compartment, a platform on the top of said body-boat structure over said toilet and adjacent said hatchway, said passenger compartment and said hatchway in the ceiling of said passenger compartment being positioned aft of the center of gravity of the body-boat and aft of the retractable landing gear to enable passengers to enter and leave the body-boat structure more readily and safely when it is positioned either on the land or in the water.

20. In a body-boat structure for water aircraft a plurality of water-tight compartments separated by water-tight bulk heads in the forward portion of said body-boat, a pilot's compartment aft of said water-tight compartment, said pilots' compartment having side, front, rear and top windows, wheels attached to said body-boat structure adjacent said pilots' compartment, a passenger compartment aft of said pilots' compartment, said passenger compartment having top and side windows and positioned aft of said pilots' compartment, a toilet aft of said passenger compartment, a ventilator in the wall of said toilet, a hatchway in the roof of said passenger compartment, a platform on the roof of said body-boat adjacent said hatchways, stairs leading from the interior of said passenger compartment up to said platform adjacent said hatchway, said passenger compartment and said hatchway in the ceiling of said passenger compartment being positioned aft of the center of gravity of the body-boat and aft of the retractable landing gear to enable passengers to enter and leave the body-boat structure more readily and safely when it is positioned either on the land or in the water.

Signed at College Point, Long Island, in the county of Queens and State of New York, this 30th day of April, A. D. 1929.

IGOR SIKORSKY.